United States Patent Office 2,716,782
Patented Sept. 6, 1955

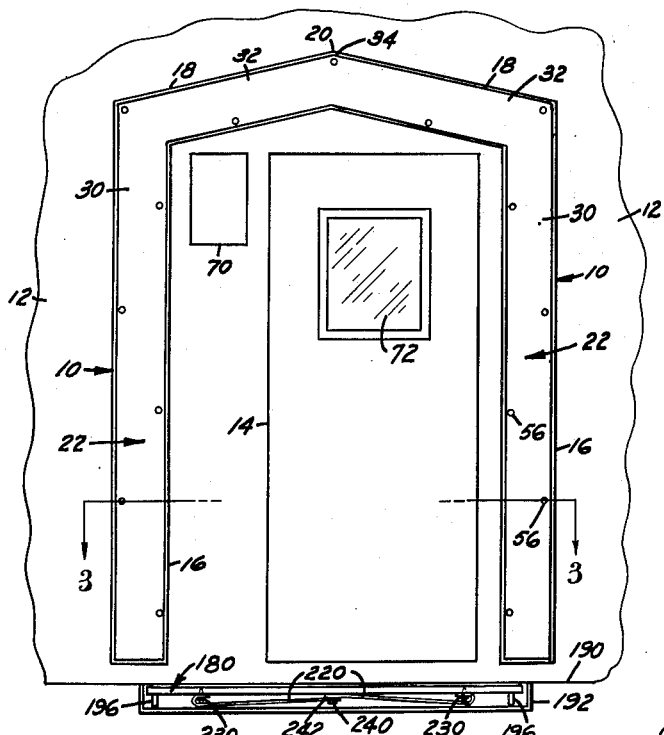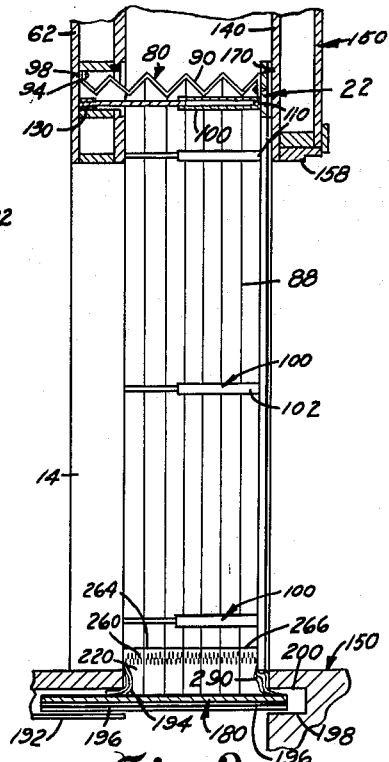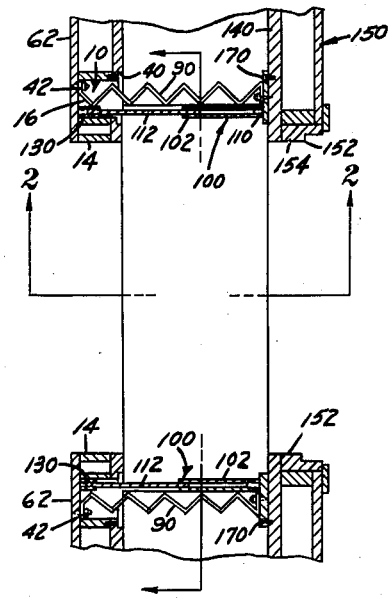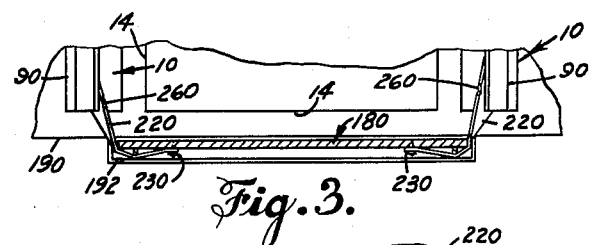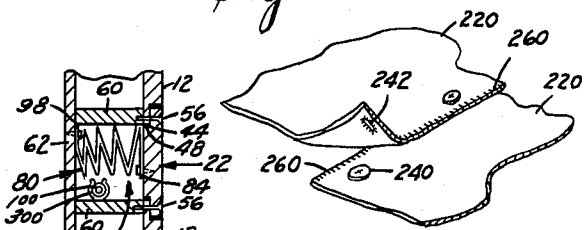

2,716,782

STORABLE INTER-SHELTER CONNECTOR

Harold A. Paulsen, Omaha, Nebr.

Application May 18, 1953, Serial No. 355,426

5 Claims. (Cl. 20—1)

This application is a continuation-in-part of my application Serial No. 321,894 filed November 21, 1952.

This invention relates to a structure for connecting a movable shelter, such as a trailer, to a stationery shelter or to another house trailer, whereby the two in combination constitute a complete "trailer home."

It is a particular object of this invention to provide a connector which can be received in an outer wall of a trailer or in a suitable recess in an outer wall of a stationery structure for convenient storge when not in use.

Yet another object is to provide a connector as described having a collapsable wall and roof and having a rigid frame adapted to be disposed in use at that end of the wall and roof which is opposite the recess for receiving the connector in storage, a rigid frame consisting or functioning to hold the respective end of a connector in a proper shape.

A further object is to provide a rigid frame as described which cooperates with means adjacent the recess for receiving the wall and roof whereby the rigid frame fills the outer end of the storage recess and thereby causes the wall in which the recess is disposed to be continuous when the connector is in storage.

A further object is to provide a connector as described having a plurality of telescoping members for supporting the rigid frame while it is being moved from its storage position across to a position abutting the opposite housing unit, trailer or stationary shelter.

Yet a further object is to provide means for storing said telescoping members in the same recess as the connector wall so as to be in a handy storage position.

A further object is to provide a connector as described with a telescoping floor mounted in storage either under a trailer or stationary shelter, and to provide means for mounting said telescoping floor in its storage position while permitting it to be pulled outwardly to extend across to the opposite housing unit, trailer or storage shelter to form a floor for the connector.

Yet another object is to provide in combination with the telescoping floor means in a stationary shelter for receiving the outer end of a telescoping floor member which is stored in an opposite housing unit.

Particularly it is an object to provide a connector which is adapted to connect a trailer to another trailer in addition to connecting a trailer to a stationary shelter.

Yet a further object is to provide means for closing the wall areas between the floor and the telescoping walls and particularly to provide adjustable means for this purpose to make possible adjustment to the amount the telescoping wall is extended.

Still another object is to provide flaps adapted to cover the areas between the floor and the telescoping wall, the flaps being stored when not in use under the floor.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Figure 1 is a frontal elevation of an entrance to a trailer or other movable shelter or of an entrance to a stationary shelter, showing the connector of this invention in storage position in a recess in the wall of the shelter and showing the floor portion of a connector slidably disposed beneath the bottom of the shelter.

Figure 2 is a cross-sectional view taken along the line 2—2 of Figure 3 with the connector in a used position.

Figure 3 is a view-in-section taken along the line 3—3 of Figure 1 but at times when the connector is open, although a view taken similarly to Figure 1 would look the same with the connector open or closed. In Figure 3 portions of a stationery shelter or other shelter whether stationary or movable are shown to illustrate the way in which the rigid frame of the connector is attached around the opening in the other shelter.

Figure 4 is a view-in-section taken along the line 4—4 and of only the lower portion of the connector and the floor thereof.

Figure 5 is a view-in-section taken along the line 3—3 of one portion of the connector, with the connector in a closed position to show the way in which the rigid frame also forms a closure for the storage recess and to show the way in which the telescoping rods are carried when not in use.

Figure 6 is a detailed view of the retaining means for the closure members at times when they are in a storage position.

The connector of this invention is adapted to be received in a recess 10 in a wall 12 of a trailer or other movable shelter or of a stationary shelter.

The recess 10 is preferably of a shape having two vertical portions spaced apart on either side of a doorway opening 14. The vertical portions are as shown at 16 and extend from points adjacent the bottom of the doorway opening 14 upwardly to points above the doorway opening and there the vertical recess portions 16 connect to inclinably dispose recess portions 18. It will be understood that the portions 18 connect together at their center in a point 20 and join at their outer ends the respective vertical portions 16. While the point 20 is preferred in order to form a pointed roof on the connector yet it is possible to cause the recess to have another shape together with other related parts.

In the recess 10 is a rigid frame generally indicated at 22. The frame 22 has vertical portions 30 which are disposed respectively in the outer ends of the recess portion 16, snugly fitting therein.

The frame portions 30 are attached at their upper ends to inclinably disposed frame portions 32 which extend from the top of the portions 30 upwardly and inwardly complementally to the inclined portions 18 of the recess and for fitting snugly therein. At their inner ends the portions 32 are joined together in a point as indicated at 34.

The recess 16 is wider at its outer end portion 40 than on its inner end portion 42 so as to provide shoulders on each side thereof against which the rigid frame member 22 can snugly fit.

It is preferred that the frame 22 has a recess 44 on inner side of all of its several portions and on each side of each portion and inset into the edge thereof, whereby the recess 44 tends to receive the shoulder 48 of the wall of the storage recess 10. In this way the outer surface of the frame member 22 is flush with and continues with the outer wall 12 of the trailer or stationary shelter.

As best seen in Figure 5 the rigid frame member 22 is held in place by bolts 56 which extend therethrough and into side walls 60 of the recess 10. The bolts 56 are disposed on each side of each portion of the frame 22 and preferably staggered as shown in Figure 1. The inner wall 62 of the trailer or stationary shelter, in which the recess 10 is located, is shown in Figures 2, 3 and 5.

The vertical portions 16 of the rigid frame 22 are preferably spaced apart sufficiently to receive not only the door opening 14 but also an opening 70 disposed preferably alongside the door opening 14. The opening 70 is for receiving an air conditioning duct, not shown. This duct is to extend through the connector to conduct either cold air, conditioned air or warm heating air or merely to circulate fresher air from air heating or conditioning units in a shelter on one side of the connector to the shelter on the other side of the connector.

The door 14 is shown as having a window 72 therein which is of no importance to this invention but is usual in trailers.

On the inner side of rigid frame member 22 a telescoping flexible wall member or closure member 80 is provided and has one end fixed to the rigid frame member 22 by a strip 84 which is itself suitably secured by screws or the like to the rigid frame member 22.

The covering portion 80 of the connector has side wall sections 88 which are attached at their upper ends to inclinably disposed roof sections 90, one of which is shown in Figure 2. It will be understood that the roof sections 90 are two in number connected at their center and are disposed directly behind the rigid frame members 32 and are disposed inclinably, complemental to the upper recess portions 18.

The covering member 80 is corrugated whereby it has a zigzag appearance in cross section and the inner ends of its vertical portions 88 are attached by securing strips 94 to the inner wall 62, the strips 94 being secured to the wall 62 by suitable screws 98.

The rigid frame member 22 is supported by telescoping assemblies 100 which preferably comprise outer pipe portions 52 attached in rigid manner and in any suitable way to the back of the rigid frame 22 at the points 110 as seen in Figures 3 and 4. The inner end of each telescoping assembly 100 is preferably a rod or pipe 112 which is suitably anchored by means of threads in a threaded anchor member 130. The anchor members 130 are themselves suitably anchored to that wall of the recess 10 which is closest adjacent the door opening 14.

As thus described the members 130 anchor the telescoping members 100 in such a way that they extend horizontally outwardly from the recess 10 and support the rigid frame 22 as it is moved from a storage position in a recess 10 outwardly to the adjacent shelter. It will be also seen that the telescoping members 100 are disposed in vertically spaced apart positions all along the back of the vertical portions 30 of the frame 22 and along the back of the upper portions 32 thereof.

The telescoping members 100 are preferably at least three in number at the upper part of the connector so as to hold the upper portions 90 of the cover 80 in desired position.

In placing the connector in use the frame 22 is moved horizontally toward the outer wall 140 of an opposite shelter 150, movable or stationary. The shelter 150 is provided with a doorway opening having a door jam member 150 on the vertical sides thereof, the doorway opening 154 having a horizontal jam member 158 defining its upper side.

The connector frame 22 preferably meets the building or shelter 150 outwardly of the doorway opening 154 on the top and sides thereof.

When the connector frame 22 is placed adjacent the building 150 it is secured by means of suitable screws 170 to the outer wall 140 thereof and the floor for the connector is shown at 180.

The floor 180 is normally stored in horizontal position under the trailer or stationary shelter of which the wall 12 is a part, the bottom of the shelter being shown at 190.

To the bottom 190 a supporting frame 192 is attached having an open outer end whereby the floor 180 can be pulled outwardly and horizontally from the opening 194 upon track members 196 disposed on either side of the floor 180 until the floor 180, with its track members 196, has reached the building or shelter 150 whereupon it extends on to a suitable supporting surface 198 thereof which can be a bottom portion of a recess 200 in the side of the building or shelter 150 so as to form a place for receiving the floor 180 and for supporting its outer end.

In order to cover the opening otherwise existing between the floor and the side portions 90 of the flexible wall two bottom closure members 220 are provided, one being shown in use position in Figure 2. The bottom closure members 220 are stored beneath the floor 180 as best seen in Figure 1 with their bottom ends anchored to the floor 180 by anchoring strips 230 which are secured to the floor 180.

In storage position the closure flaps 220 extend inwardly from the strips 230 and are secured together by a button 240 which is attached to the upper closure member 220 and buttons through a suitable button hole indicated at 242 in the closure member 220. Thus, they are retained close to the floor 180.

In use position each member 220 extends upwardly around the respective side of the floor being secured to the lower end of the side portion 88 by means of a zipper indicated at 260, the covering portions 220 being flexible for assuming a complementally corrugated shape at their upper end similar to the side walls 90.

The side portions 180 are provided with a half portion of the zipper 260 secured thereto. The upper half portion of the zipper is secured to a flap 264 which latter is secured at 266 to the inner side of a side wall 90 whereby the bottom edge of each side wall 90 extends downwardly past the zipper 260 as best seen in Figure 4 to provide a drip rim for keeping rain away from the zipper 260.

As best seen in Figure 2 each closure 220 has a fullness as indicated at 290 on its outer end for providing material to fill in under the frame 22 so as to close a small area there. If desired this fullness of material 290 can be tacked or otherwise secured against the outer side of the adjacent shelter in removable fashion.

Referring to Figure 2 and on the left hand end thereof, the covering to the closure 220 also has other fullness at the left hand end thereof which is more or less an amount in proportion to the amount the floor 180 is extended. This fullness also can be temporarily tacked against the adjacent shelter. It will be seen that the way of fixing the covering 220 can be changed somewhat within the scope of the claims and as will be obvious. The covering members 220 preferably do not extend entirely to the outer end of the floor 180 so as to be spaced from the outer end to permit the outer end to be more freely inserted into the opening 200. The closure members 220 are also spaced from the left hand end thereof as shown in Figure 2 to permit it to be more workable as some of the floor 180 remains beneath the shelter having a recess.

Referring to Figure 5 it will be seen that in the recess 10 are a plurality of brackets or clips which are attached to those side walls of the recess 10 which are closest adjacent the door opening. The purpose of the clips 300 is to make a storage space for the telescoping members 100 when they are removed from their holders 130 for storage in vertical position in the recess 10.

It will be seen from the above description that the recess 10 and the floor 180 can be mounted in the outer wall of either a stationary or movable shelter such as a trailer and can be caused to extend across to a movable shelter or stationary shelter as is diagrammatically indicated at the right hand of Figure 2.

It will be seen that the support member 192 and the floor 180 can both be made sufficiently strong to make it unnecessary to have the ledge 198 for supporting the outer end of the floor, where such ledge is not available.

This connector can have other parts added thereto but for simplicity of illustration it is believed that the drawing and description herein represent the essence of the invention and show a connector making possible a connection from trailer to movable shelter or from trailer to trailer which is of value in providing greater living area for trailer owners beyond the practical size limits of a highway movable trailer.

From the foregoing description, it is thought to be obvious that a storable inter-shelter connector constructed in accordance with my invention is particularly well adapted for use, by reason of the convenience and facility with which it may be assembled and operated, and it will also be obvious that my invention is susceptible of some change and modification thereof, and for this reason I do not wish to be understood as limiting myself to the precise arrangement and formation of the several parts herein shown in carrying out my invention in practice, except as claimed.

I claim:

1. A passageway assembly for connecting a first and second shelter, each of said shelters having opposing parallel walls, each having a doorway opening therein, said first shelter having a wall with a recess therein, said recess extending around the sides and top of said doorway opening, a rigid frame member approximately of a shape complemental to the shape of said recess, said rigid frame member having a flat outer surface disposable against the said wall of said second shelter and extending around the doorway thereof, means for supporting said frame against said second shelter wall, a covering member extending around one side of the doorway opening of said first shelter and across the top of said doorway opening and down the other side thereof similarly to said recess, said covering being foldable for fitting in said recess in storage and expandable so as to extend from said recess out to the respective side of said frame at times when said frame is disposed against said second shelter, means for securing the respective ends of said covering to said frame and to a wall of said recess, a floor member disposed under said first shelter in storage beneath the doorway opening portion of said first shelter, means for holding and receiving said floor member during storage, said floor member being slidably received in said holding means whereby the outer end of said floor member can be moved outwardly from its holding means into a position extending between said shelters beneath said covering, and closure means for closing the openings that would otherwise exist between the edges of said floor and the bottom ends of said covering.

2. The combination described in claim 1 in which the walls of the two shelters as described are included in the combination.

3. A combination as described in claim 1 in which said closure means includes two closure members fixed to said floor and further includes zippers for securing the upper edges of said closure members to the side portions of said covering, said closure members being made of flexible material for assuming shapes complemental to the adjacent portions to said covering.

4. The combination as described in claim 1 which further includes in the combination the walls of said shelters as described with a further addition of means on the walls of said second shelter for supporting the outer end of said floor.

5. The combination described in claim 1 in which a plurality of sets of horizontally telescoping members are provided interconnecting the first shelter and said frame, each set of said telescoping members comprising a first and a second member telescopingly and snugly attached together and extending horizontally for telescoping only in a horizontal plane for supporting said frame member at a time when said frame member is being moved toward said second shelter.

References Cited in the file of this patent

UNITED STATES PATENTS

| 514,923 | Gardner | Feb. 20, 1894 |
| 957,605 | Gaynor | May 10, 1910 |
| 2,405,539 | Willis | Aug. 6, 1946 |